T. BOUDREN.

Assignor of three-fourths interest to the White Man'fg. Co., G. H. Johnson & C. H. Stevens.

ADJUSTABLE LAMP-SUPPORTS FOR VEHICLES.

No. 7,544. Reissued March 6, 1877.

WITNESSES

Wm A. Skinkle

F. Stick

INVENTOR

Thomas Boudren.

By his Attorneys.

Baldwin, Hopkins & Peyton.

N. PETERS, PHOTO-LITHOGRAPHER, WASHINGTON, D. C.

UNITED STATES PATENT OFFICE.

THOMAS BOUDREN, OF BRIDGEPORT, CONNECTICUT, ASSIGNOR OF THREE-FOURTHS INTEREST TO THE WHITE MANUFACTURING COMPANY, GEORGE H. JOHNSON, AND CHARLES H. STEVENS, OF SAME PLACE.

IMPROVEMENT IN ADJUSTABLE LAMP-SUPPORTS FOR VEHICLES.

Specification forming part of Letters Patent No. 147,362, dated February 10, 1874; reissue No. 7,544, dated March 6, 1877; application filed February 19, 1877.

*To all whom it may concern:*

Be it known that I, THOMAS BOUDREN, of Bridgeport, in the county of Fairfield and State of Connecticut, have invented certain new and useful Improvements in Adjustable Lamp-Supports for Carriages, of which the following is a specification:

The object of my invention is to furnish a lamp which may be readily attached to or detached from any ordinary buggy or carriage, and to provide sure and simple means for applying the lamp to use.

Lamps for a similar purpose are at present in use on public and private conveyances; but such lamps are usually placed permanently in position when the carriage is built. My improvement does not relate to this class of carriages, but rather to those in which a lamp or lamps were not a part of the original design of the manufacturer.

Physicians and others who have occasion to drive during the night have long felt the necessity of an improvement of this nature. By my invention they are furnished with a lamp, together with such fixtures or attachments as will enable them to fasten it securely and quickly to the dash-board of their carriage, and as readily detach it in the day-time when they have no occasion for its use.

My improvement consists in providing a bracket or support for a carriage-lamp with a clamp by which it may be readily and securely attached to the dash-board of a carriage, and as easily removed when not in use.

My improvement further consists in providing the lamp-support with a joint between the clamp or outer end thereof and the lamp, with an arrangement also for connecting, adjusting, and clamping together the two parts of the support where the joint is formed, so that the lamp may be held at different angles as well as readily be detached from the outer portion of the support. This adjustable feature of my improvement enables me to apply the lamp to dash-boards of any shape, and still hold the lamp in an upright position.

Figure 1:
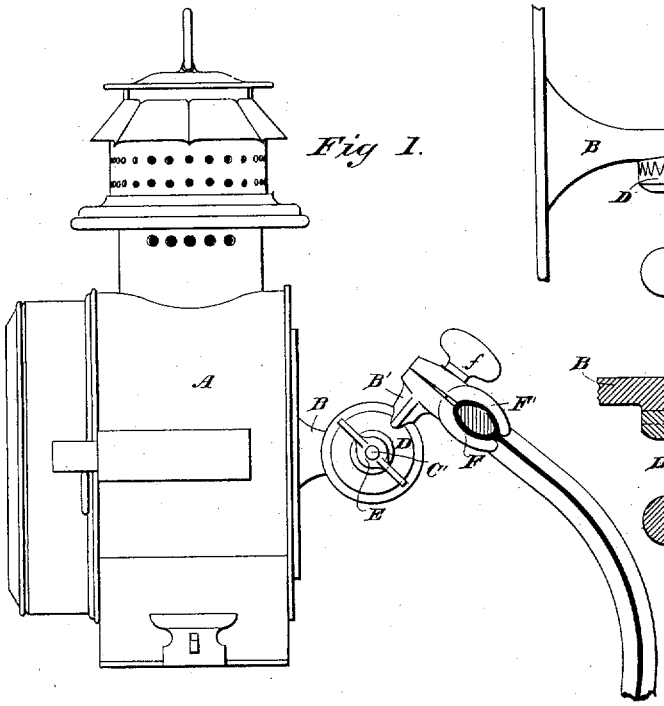
Figure 2:
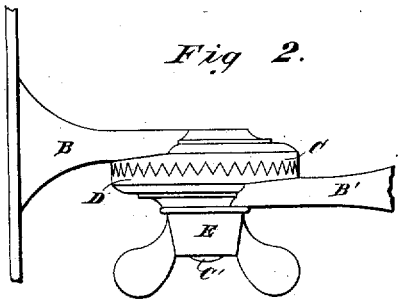
Figure 3:
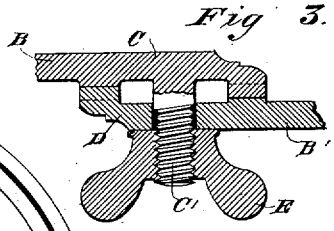
Figure 5:
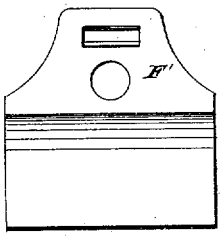
Figure 4:
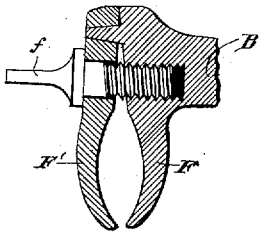
Figure 6:
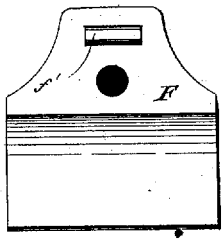
Figure 7:
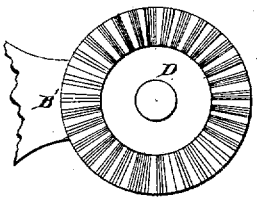

In the accompanying drawings, forming part of this specification, Figure 1 is a view in elevation, showing the lamp as attached to the dash-board of a carriage. Fig. 2 is a top or plan view of the adjustable joint and clamp by which that portion of the support secured to the lamp is connected with the outer or separable part of the support; Fig. 3, a section through the joint and clamp. Figs. 4, 5, and 6 are sectional and detail views of the clamp at the end or outer section of the supporting-arm for attachment to the dash-board. Fig. 7 is a view of a portion of the inner end, or that part of the supporting-arm fixed to the lamp, with the section of the clamp carried thereby.

A lamp, A, has secured to it a short bracket or support, B, provided with a serrated disk, C, and a threaded stud or shank, C′. The outer part B′ of the sectional supporting-arm is likewise provided, at its inner end, with a serrated disk, D, centrally perforated for the passage of the shank C′. A thumb-nut, E, serves to clamp the two parts of the jointed arm together. Clamp-jaws F F′ are carried by the outer end of the jointed supporting-arm B B′, for attachment to the dash-board of the carriage. This clamp is of peculiar construction, the section F being provided with a screw-tap or female screw to receive a clamping-screw, *f*, and a short projection or lug, *f′*, fitting in a slot in the detachable jaw, F′. The jaws are curved to fit the dash-board, and are clamped thereto by means of the screw without puncturing the dash-board or defacing it by the screw, which, it will be seen, passes through the clamping-jaws outside of the dash-board. The movable jaw of the clamp is guided and supported by the lug *f′* in securing the supporting-arm upon the dash-board.

The manner of using my improvement is as follows: The two parts of the clamp at the end of the support are placed so as to straddle the dash, and securely fastened thereon by the thumb-screw *f*. To adjust the lamp to an upright position I have simply to turn the thumb-nut E to the left, which allows the serrated disks C and D to be separated sufficiently to turn the lamp to any required position. The disks can then be brought together again and fastened, the serrated portions fitting into each other, as shown in Figs. 2 and 3, and making a rigid joint. The lamp may be easily detached, either at the joint or at the dash-board, if desirable, and used as a lantern, the support or bracket forming a convenient handle or means of securing it in place. I usually solder the lamp to the support, but it is obvious it may be fastened in other ways.

Different styles of clamps from those I have described may also be used. The clamp for the dash-board might be hinged at the top, and have the thumb-screw *f* pass through the dash.

I do not claim anything, broadly, on the serrated disks C and D, as I am aware that they are used in other combinations and for other purposes.

I claim as my invention—

1. The combination of the lamp, its support, and the clamping-jaws and set-screw for detachably securing the arm to the dash-board, substantially as described.

2. The combination of the lamp, the jointed supporting-arm provided with an adjusting-clamp, and the clamp at the outer end of the supporting-arm for attachment to the dash-board, substantially as set forth.

3. The hereinbefore-described vehicle-lamp having the short rigid arm or bracket projecting from the lamp, and a second arm adjustably jointed to the said rigid arm, and adapted to be detachably secured in position at its outer end.

4. The combination of the lamp with a jointed supporting-arm capable of being adjusted or rocked vertically and provided with a clamp, by which it is retained in the desired position.

5. The combination of the lamp, its short rigid arm or bracket, and the serrated disk or clamp-section carried by said bracket, substantially as and for the purpose specified.

THOMAS BOUDREN.

Witnesses:

JOHN E. POND,

S. H. PATTERSON.